Aug. 10, 1948.   H. O. KLINKE   2,446,598
AUTOMATIC ARC WELDING APPARATUS
Filed Feb. 7, 1946
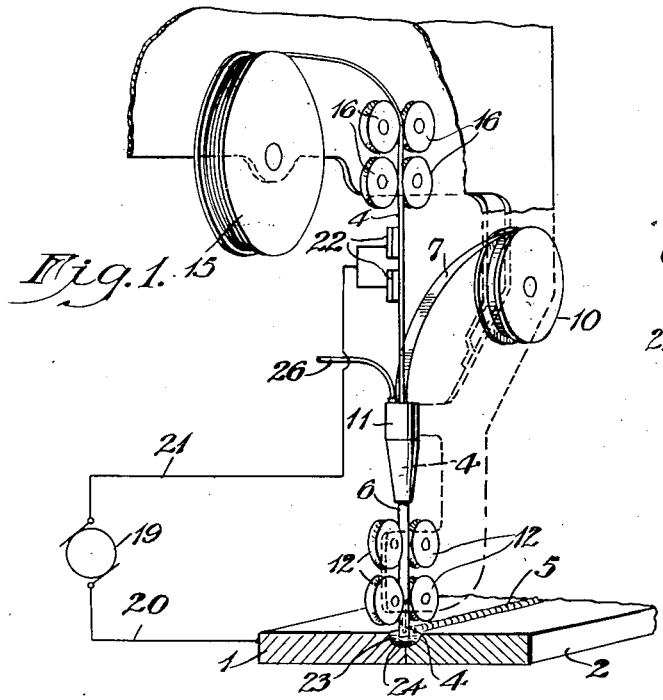
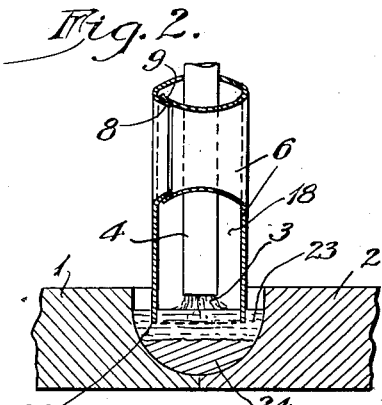
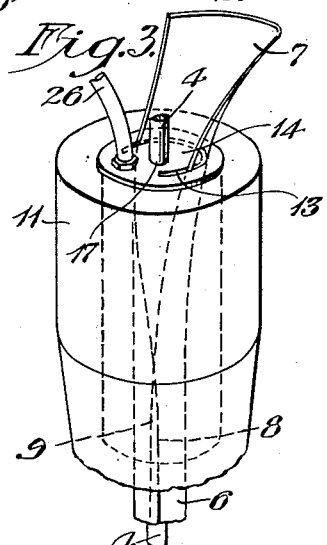
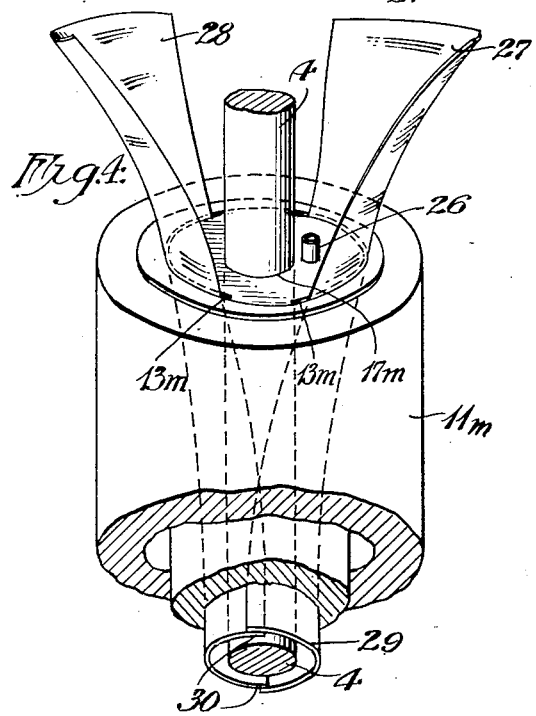
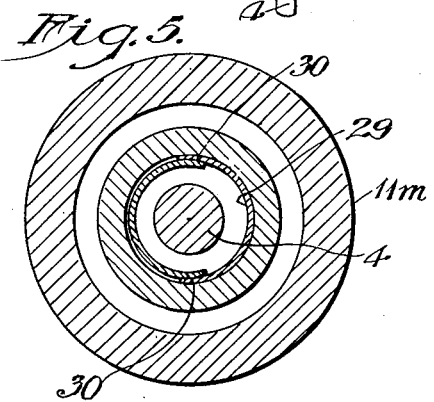
INVENTOR
HENRY O. KLINKE
BY
ATTORNEYS Patented Aug. 10, 1948

2,446,598

UNITED STATES PATENT OFFICE 2,446,598

AUTOMATIC ARC WELDING APPARATUS

Henry O. Klinke, Forest Hills, N. Y., assignor to Air Reduction Company, Incorporated, a corporation of New York Application February 7, 1946, Serial No. 646,078

6 Claims. (Cl. 219—8)

This invention relates to arc welding and more particularly to an improved automatic welding apparatus for shielded-arc welding.

The primary object of the invention is to provide an automatic welding apparatus which will produce a welding arc having the characteristics of deep penetration and a high rate of deposition of metal from the electrode to the work.

The invention also has as an objective the provision of welding apparatus capable of carrying out a welding operation at a faster rate than heretofore.

A further object of the invention is to provide a shielded-arc welding apparatus which is simple in construction and easy to operate.

For an understanding of the invention attention is directed to the accompanying drawings and the following description wherein is set forth, by way of example, one embodiment of the improved welding apparatus. In these drawings:

Fig. 1 is a perspective and somewhat diagrammatic view of the welding apparatus, shown in the operation of butt welding the edges of two metal plates which are illustrated in vertical transverse section taken through the weld just in front of the arc;

Fig. 2 is a similar section, drawn to an enlarged scale, taken centrally through the weld and with parts cut away and shown in vertical section;

Fig. 3 is a perspective view of one of the parts of the welding apparatus, drawn to about the same scale as Fig. 2;

Fig. 4 is a perspective view of a modified form of the device shown in Fig. 3, drawn to a still larger scale; and Fig. 5 is a view showing the device of Fig. 4 in transverse section taken near the lower end of the device.

Referring now to the accompanying drawings, and first to Fig. 1, the work to be welded consists of two metal plates 1 and 2 which rest on any suitable support (not shown), and are being welded together along their contacting edges by means of a welding arc 3 between the lower end of an electrode 4 and the work pieces 1 and 2, the deposited metal which serves to re-enforce the welded seam being indicated at 5. Electrode 4 is surrounded by a shielding tube 6 consisting of strip material 7 of suitable composition, shaped or curved into the form of a tube, preferably circular in cross-section, and having overlapping but unconnected edges 8 and 9 (Fig. 2).

The strip or ribbon 7 is coiled upon a magazine reel 10 from which it is removed and fed downwardly through a forming die 11 from the bottom of which it emerges in tubular shape. The tube 6 thus formed then passes between friction feed rolls 12 by means of which it is drawn through die 11 and fed towards the work 1, 2. Forming device 11 has an arcuate entrance slot 13 (Fig. 3) on the interior of which is a forming mandrel 14 around whose surface the flat strip 7 is bent and formed into tubular shape. It will be understood that, if desired, device 11, instead of bending strip 7 laterally to form shielding tube 6, may be constructed to form a tubular structure by twisting the strip into a helical coil.

The material of which electrode 4 is constituted is wound upon a second magazine reel 15 (Fig. 1) disposed somewhat above magazine reel 10. The electrode material is fed from reel 15 through a set of feeding and straightening rolls 16 which straighten it to form electrode 4 and feed it downwardly through an aperture 17 (Fig. 3) disposed centrally of mandrel 14 so that the electrode is fed into the center of the tube 6, the tube surrounding the electrode with its inner walls radially separated from the same to provide an annular space 18 (Fig. 2) for the reception of the gas or gases for shielding the arc.

Welding current is supplied from a welding generator indicated diagrammatically at 19 (Fig. 1), one terminal of which is connected by means of a conductor 20 to the work 1, 2. The other terminal of welding generator 19 is connected by means of a conductor 21 and a pair of contact brushes 22 with electrode 4.

As will appear later, shielding tube 6 may be of conductive material, and in order to insulate electrode 4 from it the forming die may be made in whole or in part of non-conducting material; for example, mandrel 14 may be made of such material inasmuch as this part contains aperture 17 for guiding the electrode. If it is desired to make the forming die of conducting material throughout, a sleeve or bushing of insulating material may be inserted to carry aperture 17 or to carry an inner metal sleeve containing this aperture.

It will be understood that the electrode feed rolls 16 and the shielding tube feed rolls 12 are mechanically driven by means of any convenient power source, such, for example, as an electric motor, their rates of feed preferably being independently adjustable. It will be understood also that these feed rolls, the magazine reels 10 and 15, brushes 22, and forming die 11 are all mounted on a common support, such as the traveling head of a standard welding machine and arranged to travel along the joint to be welded. Such a traveling head is of well known construction and it is therefore believed unnecessary to illustrate or describe it in detail. It will also be understood that the apparatus is provided with suitable voltage control devices to hold the arc voltage at a predetermined value, such control devices also being well known in the art.

In the operation of the apparatus the arc 3 melts metal from the work pieces 1 and 2 to build a pool 23 of molten metal, below which may be either the metal of the work pieces 1 and 2 or, as shown in Fig. 2, a body 24 of previously deposited and solidified welding metal. In accordance with one of the features of the present invention, the feeding mechanism for feeding strip 7 through forming die 11 (this comprising in the apparatus shown the feed rolls 12) is arranged to feed strip 7 and shielding tube 6 towards the work 1, 2 at such a rate as to maintain the lower end 25 of shielding tube 6 below the surface of the body of molten metal 23. The material of shielding tube 6 is thereby melted and, depending upon the composition of the tube, either is added to the molten pool 23 or forms a slag upon its surface.

The maintenance of the end 25 of tube 6 below the surface of molten pool 23 effectively seals the gas shielding space 18 from the entrance of air. This space may become filled either with gases resulting from the vaporizing action of arc 3 or may be filled with an appropriate inert gas introduced into the space. For such purposes a porting tube 26 is mounted on the upper end of forming die 11 to communicate through a passage (not shown) in the forming die with the interior of the upper end of tube 6.

Porting tube 26 may serve either as an outlet for gases formed within tube 6 in the manner just explained, or it may serve as an inlet for the introduction of a suitable inert gas such, for example, as nitrogen or helium. For the purpose of purging the surface of the pool of slag, oxygen may also be introduced through tube 26. It will be understood that forming die 11 may be provided with a second tube similar to tube 26 in communication with the interior of shielding tube 6 and one of these tubes employed as a gas inlet and the other as a gas outlet.

The strip 7 from which shielding tube 6 is formed may consist of a thin metallic strip or a strip of flux-coated metal, in which case, as the tube is consumed the metal of this strip will be added to the pool 23 and ultimately constitute a part of the deposited metal 5 of the weld. Strip 7 may also consist of a flux-impregnated cellulosic strip and in that case it will be vaporized by the heat of the arc, leaving an ash which will collect on the surface of pool 23. The flux coating of the metal strip or from the cellulosic strip floats and covers the molten pool 23 shielding it from the air, particularly at the start or at any interruption of the welding operation.

If desired, in order to assist the uniform melting or consumption of shielding tube 6, the reels 10 and 15, forming die 11, and feed rolls 12 and 16 may be arranged to rotate slowly with respect to the welding carriage as the carriage travels along the weld.

Figs. 4 and 5 illustrate a modification of forming die 11. In this modification, indicated by reference numeral 11m, two symmetrically arranged arcuate slots 13m are provided, instead of a single slot, and two strips or ribbons 27 and 28 are fed into these slots. As these strips pass through the forming die they are bent or curved into semi-circular form as shown at the bottom of Fig. 4 and in section in Fig. 5, forming complementary halves of a shielding tube 29, the edges of both halves overlapping one another as indicated at 30 so as to form a closed tube. Since two strips are employed in forming sealing tube 29 they need be only about one-half as wide as strip 7 used in forming shielding tube 6, Figs. 4 and 5 being drawn to a considerably magnified scale.

It will be understood that the electrode 4 is fed downwardly through a central aperture 17m and that the electrode and the shielding tube 29 are fed simultaneously towards the work, as before. It will also be understood that one or more gas porting tubes 26 communicate through the forming die 11m with the interior of the upper end of shielding tube 29.

In the operation of this welding apparatus, since the shielding tubes 6 or 29, whichever may be used, dip below the surface of molten pool 23, the welding arc 3 is completely surrounded by a shielding layer of gas which protects the metal, both at the lower end of electrode 3 and in pool 23 immediately beneath the end of the electrode, from oxidation. This enables a high current arc to be maintained so that the depth of penetration of the work by the arc and the rate of deposition of metal are accordingly high; it also permits the traveling head or carriage of the welding machine to be moved rapidly along the work and lowers the time required for a given welding operation.

Having set forth the invention in what is considered to be the best embodiment thereof, it will be understood that changes may be made in the apparatus as above set forth without departing from the spirit of the invention or exceeding the scope thereof as defined in the following claims.

What is claimed as new and desired to secure by Letters Patent of the United States is:

I claim:

1. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, and tube feeding means for supporting and feeding said tube towards the work and maintaining the lower end thereof below the surface of said pool.

2. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, and means for supporting said tube and maintaining the lower end thereof below the surface of said pool.

3. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, means for supporting said tube and maintaining the lower end thereof below the surface of said pool, and means for supplying an inert gas to the interior of said tube.

4. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, and tube feeding means for supporting and feeding said tube towards the work and maintaining the lower end thereof below the surface of said pool, said tube being electrically insulated from the electrode and being made of metal that will melt by its contact with the hot metal forming said pool whereby the metal of the tube will be added to the pool metal.

5. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, and tube feeding means for supporting and feeding said tube towards the work and maintaining the lower end thereof below the surface of said pool, said tube being electrically insulated from the electrode and being made of metal that will melt by its contact with the hot metal forming said pool whereby the metal of the tube will be added to the pool metal, and the distance from the electrode to the inner surface of said metal tube being greater than the distance from the electrode to the parent metal.

6. Arc welding apparatus comprising a metallic electrode, feeding means for supporting and feeding said electrode towards the work to be welded, means for supplying welding current to the electrode and the work, the welding arc forming a pool of molten metal around said electrode, a shielding tube surrounding and spaced from the electrode, and tube feeding means for supporting and feeding said tube towards the work and maintaining the lower end thereof below the surface of said pool, said tube being electrically insulated from the electrode and being made of metal that will melt by its contact with the hot metal forming said pool, and said metal tube having a flux coating whereby as the lower end of the metal tube melts the flux deposits on the surface of said pool of molten metal and shields the pool from the atmosphere external to the tube.

HENRY O. KLINKE.

REFERENCES CITED

The following references are of record in the file of this patent:

UNITED STATES PATENTS

| Number | Name | Date |
|---|---|---|
| 1,886,643 | Chapman | Nov. 8, 1932 |
| 1,954,343 | August | Apr. 10, 1934 |
| 2,087,225 | Austin | July 13, 1937 |
| 2,121,693 | Henderson | June 21, 1938 |
| 2,149,490 | Allard | Mar. 7, 1939 |